(12) United States Patent
Sakata et al.

(10) Patent No.: US 8,246,819 B2
(45) Date of Patent: Aug. 21, 2012

(54) AUTOMATIC TRANSMISSION FLUID FILTER

(75) Inventors: Haruaki Sakata, Kariya (JP); Yasuhiro Saito, Kariya (JP); Toshiaki Mori, Kariya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/081,785

(22) Filed: Apr. 7, 2011

(65) Prior Publication Data

US 2011/0259810 A1    Oct. 27, 2011

(30) Foreign Application Priority Data

Apr. 26, 2010 (JP) .................... 2010-101471

(51) Int. Cl.
 *B01D 29/07* (2006.01)
 *B01D 35/30* (2006.01)
 *B01D 35/027* (2006.01)
(52) U.S. Cl. .......... 210/167.08; 210/232; 210/435; 210/493.3; 210/445; 55/DIG. 5; 156/272.8; 219/121.64
(58) Field of Classification Search .......... None
See application file for complete search history.

(56) References Cited

U.S. PATENT DOCUMENTS

| | | | | |
|---|---|---|---|---|
| 3,712,033 A * | 1/1973 | Gronholz | .............. | 55/493 |
| 3,765,536 A * | 10/1973 | Rosenberg | .............. | 210/446 |
| 3,765,537 A * | 10/1973 | Rosenberg | .............. | 210/446 |
| 3,782,083 A * | 1/1974 | Rosenberg | .............. | 55/491 |
| 3,815,754 A * | 6/1974 | Rosenberg | .............. | 210/445 |
| 4,148,732 A * | 4/1979 | Burrow et al. | .............. | 210/232 |
| 4,187,182 A * | 2/1980 | Rosenberg | .............. | 210/445 |
| 4,666,594 A * | 5/1987 | Schneider | .............. | 210/167.08 |
| 4,828,694 A * | 5/1989 | Leason | .............. | 210/167.08 |
| 5,376,270 A * | 12/1994 | Spearman | .............. | 210/445 |
| 5,489,352 A * | 2/1996 | Spearman | .............. | 156/69 |
| 5,494,575 A * | 2/1996 | Kitajima et al. | .............. | 210/167.04 |
| 5,599,448 A * | 2/1997 | Spearman | .............. | 210/445 |
| 6,131,573 A * | 10/2000 | Brown | .............. | 128/205.27 |
| 6,159,260 A * | 12/2000 | Hammes | .............. | 55/502 |
| 6,190,546 B1 * | 2/2001 | Agner | .............. | 210/167.08 |
| 6,193,833 B1 * | 2/2001 | Gizowski et al. | .............. | 156/272.8 |
| 6,294,083 B1 * | 9/2001 | Lee et al. | .............. | 210/130 |
| 6,432,307 B2 * | 8/2002 | Gizowski et al. | .............. | 210/321.6 |
| 6,568,540 B1 * | 5/2003 | Holzmann et al. | .............. | 210/445 |
| 6,648,146 B2 * | 11/2003 | Beer et al. | .............. | 210/405 |
| 6,715,459 B2 * | 4/2004 | Rosendahl et al. | .............. | 123/195 C |
| 6,835,306 B2 * | 12/2004 | Caldwell | .............. | 210/167.04 |
| 6,890,366 B2 * | 5/2005 | Bugli et al. | .............. | 55/385.3 |
| 7,087,160 B2 * | 8/2006 | Beer et al. | .............. | 210/167.02 |

(Continued)

FOREIGN PATENT DOCUMENTS

JP    8-24532    1/1996

*Primary Examiner* — Robert James Popovics
(74) *Attorney, Agent, or Firm* — Greenblum & Bernstein, P.L.C.

(57) ABSTRACT

The automatic transmission fluid filter includes a plastic upper case having an outlet port, a plastic lower case having an inlet port, and a filter element including a filter medium and a plastic holder frame holding the periphery of the filter medium and held between the upper case and lower case, at least one of the upper case and lower case including a pair of joint portions respectively joined to opposite walls a of the holder frame, and a connecting wall connecting the pair of joint portions and having a circular arc longitudinal cross section protruding outward of one case.

8 Claims, 5 Drawing Sheets

U.S. PATENT DOCUMENTS

| | | | |
|---|---|---|---|
| 7,258,789 B2* | 8/2007 | Peet et al. | 210/232 |
| 7,261,814 B2* | 8/2007 | Peet et al. | 210/232 |
| 7,282,140 B2* | 10/2007 | Boast et al. | 210/130 |
| 7,357,865 B1* | 4/2008 | Nader | 210/232 |
| 7,845,500 B2* | 12/2010 | Hueppchen et al. | 210/455 |
| 7,998,347 B2* | 8/2011 | Pekarsky et al. | 210/253 |
| 8,006,848 B2* | 8/2011 | Goto | 210/435 |
| 8,038,877 B2* | 10/2011 | Stausberg et al. | 210/167.08 |
| 8,052,867 B2* | 11/2011 | Khalil et al. | 210/167.04 |
| 2001/0000894 A1* | 5/2001 | Gizowski et al. | 210/435 |
| 2002/0121473 A1* | 9/2002 | Boast et al. | 210/450 |
| 2003/0006179 A1* | 1/2003 | Caldwell | 210/168 |
| 2003/0201216 A1* | 10/2003 | Wolford et al. | 210/130 |
| 2004/0206058 A1* | 10/2004 | Bugli et al. | 55/385.3 |
| 2004/0256046 A1* | 12/2004 | Sakakibara | 156/73.6 |
| 2005/0087481 A1* | 4/2005 | Boast et al. | 210/130 |
| 2005/0098508 A1* | 5/2005 | Caldwell | 210/805 |
| 2005/0133421 A1* | 6/2005 | Peet et al. | 210/168 |
| 2005/0139534 A1* | 6/2005 | Peet et al. | 210/168 |
| 2005/0230323 A1* | 10/2005 | Peet et al. | 210/767 |
| 2005/0230324 A1* | 10/2005 | Peet et al. | 210/767 |
| 2006/0191840 A1* | 8/2006 | Homi | 210/435 |
| 2006/0219624 A1* | 10/2006 | Kuno | 210/435 |
| 2008/0169235 A1* | 7/2008 | Goto | 210/454 |
| 2008/0290013 A1* | 11/2008 | Stausberg et al. | 210/167.04 |
| 2009/0127174 A1* | 5/2009 | Shinbori et al. | 210/167.08 |
| 2009/0134088 A1 | 5/2009 | Morishita et al. | |
| 2009/0139922 A1* | 6/2009 | Poskie et al. | 210/167.08 |
| 2009/0294343 A1* | 12/2009 | Pekarsky et al. | 210/167.08 |
| 2009/0301954 A1* | 12/2009 | Beer et al. | 210/167.08 |
| 2010/0038296 A1* | 2/2010 | Beer et al. | 210/167.03 |
| 2011/0259810 A1* | 10/2011 | Sakata et al. | 210/358 |

* cited by examiner

AUTOMATIC TRANSMISSION FLUID FILTER

CROSS-REFERENCE TO RELATED APPLICATIONS

The present application claims priority under 35 U.S.C. §119 of Japanese Application No. 2010-101471 filed on Apr. 26, 2010, the disclosure of which is expressly incorporated by reference herein in its entirety.

BACKGROUND OF THE INVENTION

1. Field of the Invention

The present invention relates to an automatic transmission fluid filter, and more particularly to an aesthetically pleasing automatic transmission fluid filter designed to be able to have improved case rigidity and fabrication properties as well as to be able to reduce pressure loss during use of the filter.

2. Description of Related Art

A commonly known conventional automatic transmission filter includes, for example as shown in FIG. 10, an upper case 102 having an outlet port 102a, a lower case 103 having an inlet port 103a, and a filter element 106 including a filter medium 104 and a holder frame 105 holding the periphery of the filter medium 104 and held between both cases 102 and 103. A plurality of ribs 107 are formed to extend in the width direction of the case on inner surfaces of both cases 102 and 103 so as to enhance the case rigidity. These ribs 107 prevent deformation of the case toward the filter element due to suction negative pressure and a consequent increase in pressure loss, which will lead to performance deterioration. Japanese Patent Application Laid-Open No. 8-24532 discloses a fluid filter with an upper case and a lower case formed with ribs on their inner surfaces for preventing deformation of the filter medium.

However, with the conventional automatic transmission fluid filter mentioned above, sink marks easily occur during the case molding process because of the plurality of internally formed ribs 107 of the cases 102 and 103, resulting in poor outer appearance. The case appearance is significantly deteriorated, in particular, when a case that is transparent or translucent is joined with the holder frame by laser welding. The ribs also cause an increase in the amount of use of resin which leads to a higher production cost. Another problem was that the ribs have a large impact on the flow properties of a fluid flowing through the filter chamber during use, causing an increase in pressure loss.

SUMMARY OF THE INVENTION

The embodiments of the present invention are provided to address the problems with the conventional technology above. An advantage of the embodiments of the present invention is to provide an aesthetically pleasing automatic transmission fluid filter designed to be able to have improved case rigidity and fabrication properties as well as to be able to reduce pressure loss during use of the filter.

One aspect of the present embodiments provides an automatic transmission fluid filter including a plastic upper case having an outlet port; a plastic lower case having an inlet port; and a filter element including a filter medium and a plastic holder frame holding a peripheral part of the filter medium and held between the upper case and the lower case, wherein at least one of the upper case and the lower case including a pair of joint portions respectively joined to opposite walls of the holder frame, and a connecting wall connecting the pair of joint portions and having a circular arc longitudinal cross section protruding outward of one case.

In a further aspect, the pair of joint portions respectively include a first lateral wall having an outer end joined to the wall of the holder frame and extending laterally inward of the one case, a vertical wall standing from an inner end of the first lateral wall, and a second lateral wall extending laterally inward of the one case from a standing distal end of the vertical wall, outer ends of the connecting wall being connected to inner ends of the second lateral walls.

In a further aspect, the pair of joint portions respectively include a first lateral wall having an outer end joined to the wall of the holder frame and extending laterally inward of the one case, and a vertical wall standing from an inner end of the first lateral wall, outer ends of the connecting wall being connected to standing distal ends of the vertical walls.

In a further aspect, the one case is made of a laser transmitting resin while the holder frame is made of a laser absorbing resin, and the joint portions are joined to the walls of the holder frame by laser welding.

In the automatic transmission fluid filter according to the present embodiments, at least one of the cases includes a pair of joint portions respectively joined to the opposite walls of the holder frame, and a connecting wall connecting the pair of joint portions and having a circular arc longitudinal cross section protruding outward of one case, so that the cases need not be provided with any ribs on the inner surfaces and yet can have enhanced rigidity due to the connecting wall having a circular arc longitudinal cross section. The cases have a substantially uniform wall thickness so that resin flowability during the case molding process is improved, as well as the amount of use of resin can be reduced, i.e., the case fabrication properties can be improved. Also, the fluid inside the cases will have better flow properties during the use of the filter so that the pressure loss can be reduced. Further, the cases have a good appearance.

If the pair of joint portions are formed to respectively include a first lateral wall, a vertical wall, and a second lateral wall, and the outer ends of the connecting wall are connected to the inner ends of the second lateral walls, the stress locally applied on the cases by the vertical walls can be dispersed and the points of stress can be distanced from the first lateral walls, whereby the rigidity (in particular, joint strength) of the cases can be further improved. Since the first lateral walls can be joined to the walls of the holder frame in a state in which the first lateral walls and second lateral walls are pressed down with jigs, the case fabrication properties can be further improved. When the first lateral walls and the second lateral walls are pressed down with the jigs, the first lateral walls can conform to the walls of the holder frame due to flexure of the vertical walls, which contributes to a further improvement in the case fabrication properties.

If the pair of joint portions are formed to respectively include a first lateral wall and a vertical wall, and the outer ends of the connecting wall are connected to the distal ends of the vertical walls, the stress locally applied on the cases by the vertical walls can be dispersed and the points of stress can be distanced from the first lateral walls, whereby the rigidity (in particular, joint strength) of the cases can be further improved.

If one of the cases is made of a laser transmitting resin, while the holder frame is made of a laser absorbing resin, and the joint portions are joined to the walls of the holder frame by laser welding, the case can be easily joined to the holder frame and can have a good appearance even though a transparent or translucent material is employed for the case.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Figure 1:
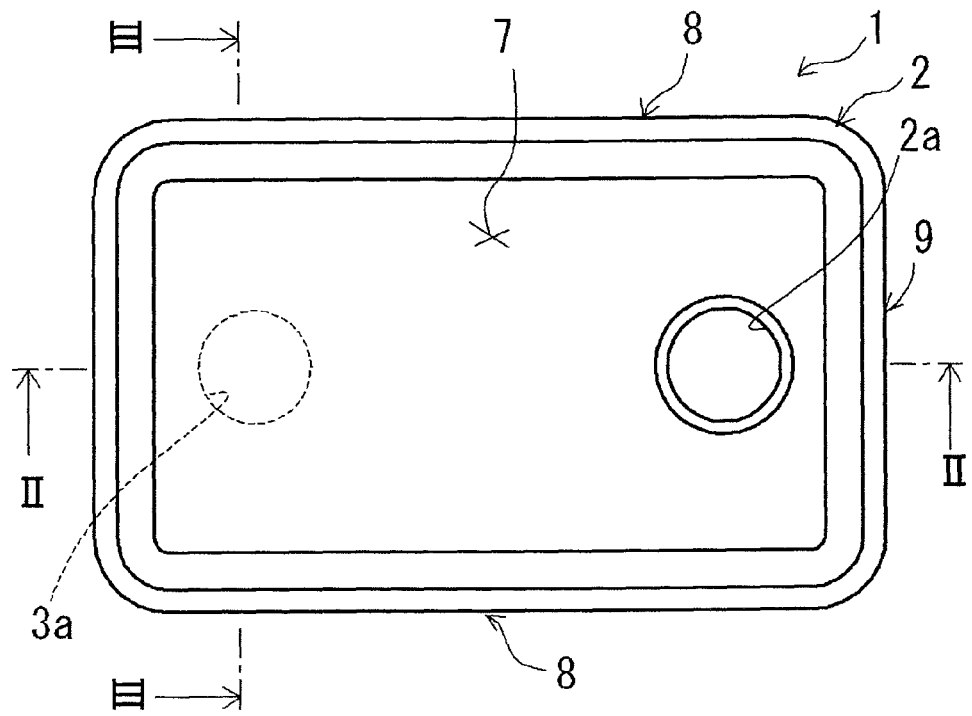
FIG. 1 is a plan view of an oil filter according to one example embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The automatic transmission fluid filter according to the present embodiments includes a plastic upper case (2) having an outlet port, a plastic lower case (3) having an inlet port, and a filter element (6) including a filter medium (4) and a plastic holder frame (5) holding the periphery of the filter medium and held between the upper case and lower case. The automatic transmission fluid filter is characterized in that at least one of the upper case and lower case includes a pair of joint portions (8, 10) respectively joined to opposite walls (5*a*) of the holder frame, and a connecting wall (7, 17) connecting the pair of joint portions and having a circular arc longitudinal cross section protruding outward of one case (see, for example, FIG. 3 etc.).

Figure 6:
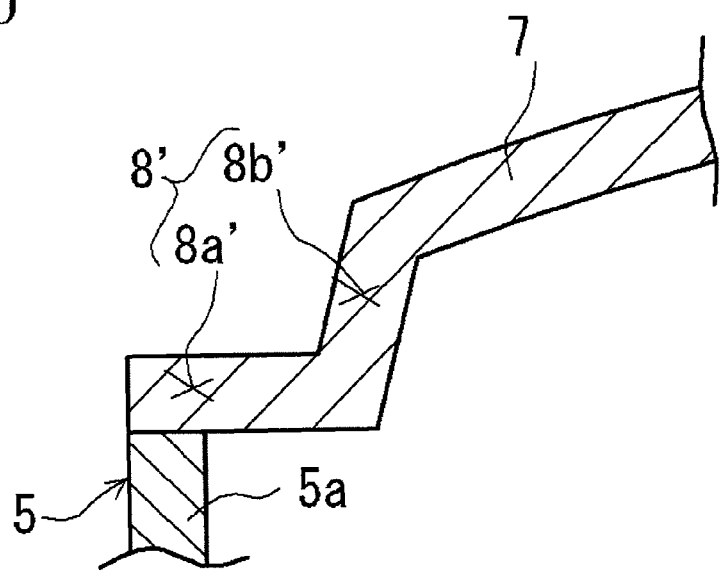
FIG. 6 is a sectional view of essential parts for describing an upper case according to another example embodiment.
Figure 7:
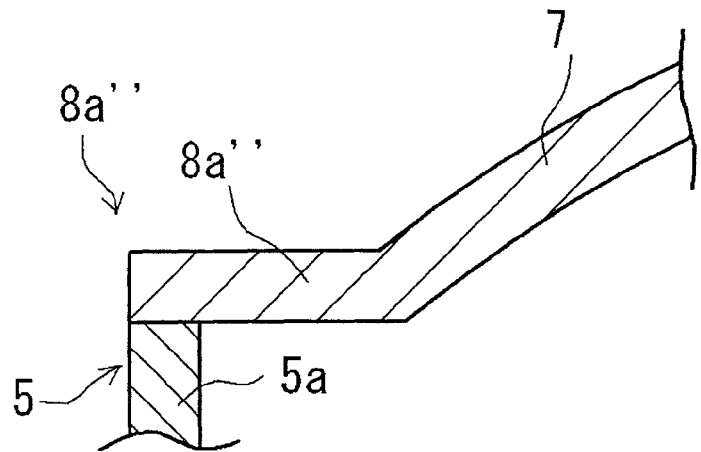
FIG. 7 is a sectional view of essential parts for describing an upper case according to yet another example embodiment.

The automatic transmission fluid filter according to the present embodiments may include, for example, the following three forms: [1] The pair of joint portions respectively include a first lateral wall (8*a*, 10*a*) having an outer end joined to the wall of the holder frame and extending laterally inward of the one case, a vertical wall (8*b*, 10*b*) standing from an inner end of the first lateral wall, and a second lateral wall (8*c*, 10*c*) extending laterally inward of the one case from a standing distal end of the vertical wall, outer ends of the connecting wall being connected to inner ends of the second lateral walls (see, for example, FIG. 3, etc.). [2] The pair of joint portions respectively include a first lateral wall (8*a'*) having an outer end joined to the wall of the holder frame and extending laterally inward of the one case, and a vertical wall (8*b'*) standing from an inner end of the first lateral wall, outer ends of the connecting wall being connected to standing distal ends of the vertical walls (see, for example, FIG. 6, etc.). [3] The pair of joint portions respectively include a first lateral wall (8*a"*) having an outer end joined to the wall of the holder frame and extending laterally inward of the one case, outer ends of the connecting wall being connected to inner ends of the first lateral walls (see, for example, FIG. 7, etc.).

The automatic transmission fluid filter according to the present embodiments may include a form, for example, in which one case is made of a laser transmitting resin while the holder frame is made of a laser absorbing resin, and the joint portions are joined to the walls of the holder frame by laser welding. In this case, the form [1] described above is particularly preferable, since the first lateral wall of one case and the holder frame can be readily and reliably joined together by irradiating a laser beam (L) from one case toward the wall of the holder frame through a gap between jigs (15*a*, 15*b*) pressing down the first lateral wall and second lateral wall (see, for example, FIG. 5, etc.).

Figure 5:
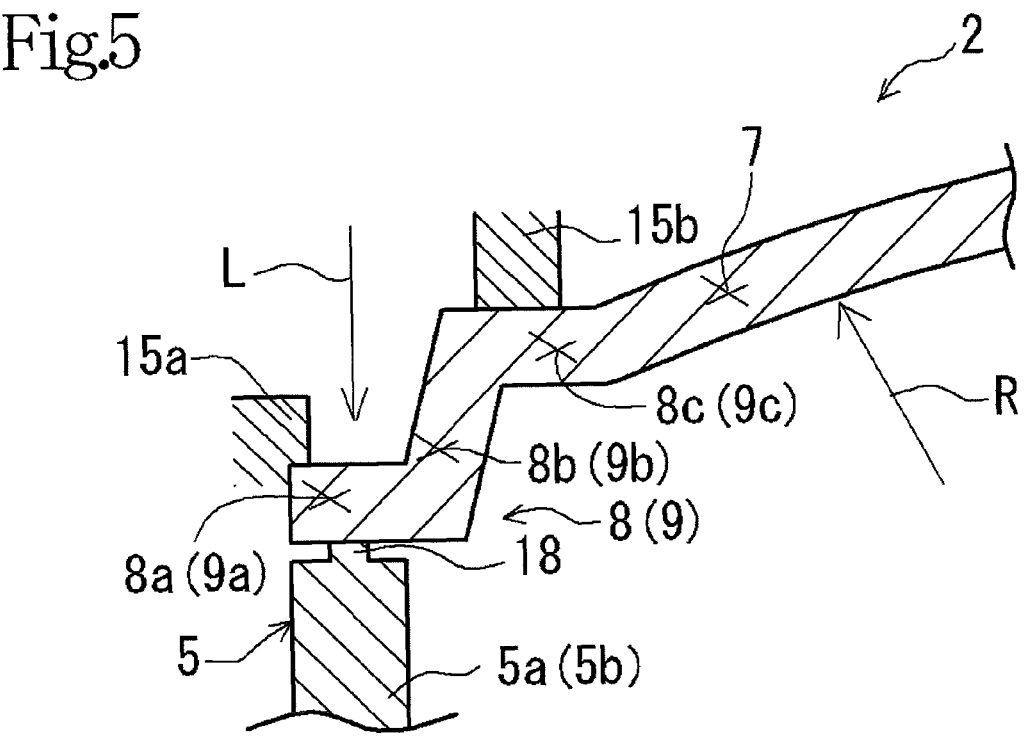
FIG. 5 is a diagram for describing a method of producing the above oil filter.

The automatic transmission fluid filter according to the present embodiments may include a form, for example, in which the connecting wall has a radius of curvature (R) of from 50 to 300 mm (preferably from 100 to 200 mm, in particular from 130 to 180 mm) (see, for example, FIG. 5, etc.). Thereby the case can have improved rigidity, and a minimum necessary space inside so as to prevent deterioration of the flow properties of the fluid.

Figure 4:
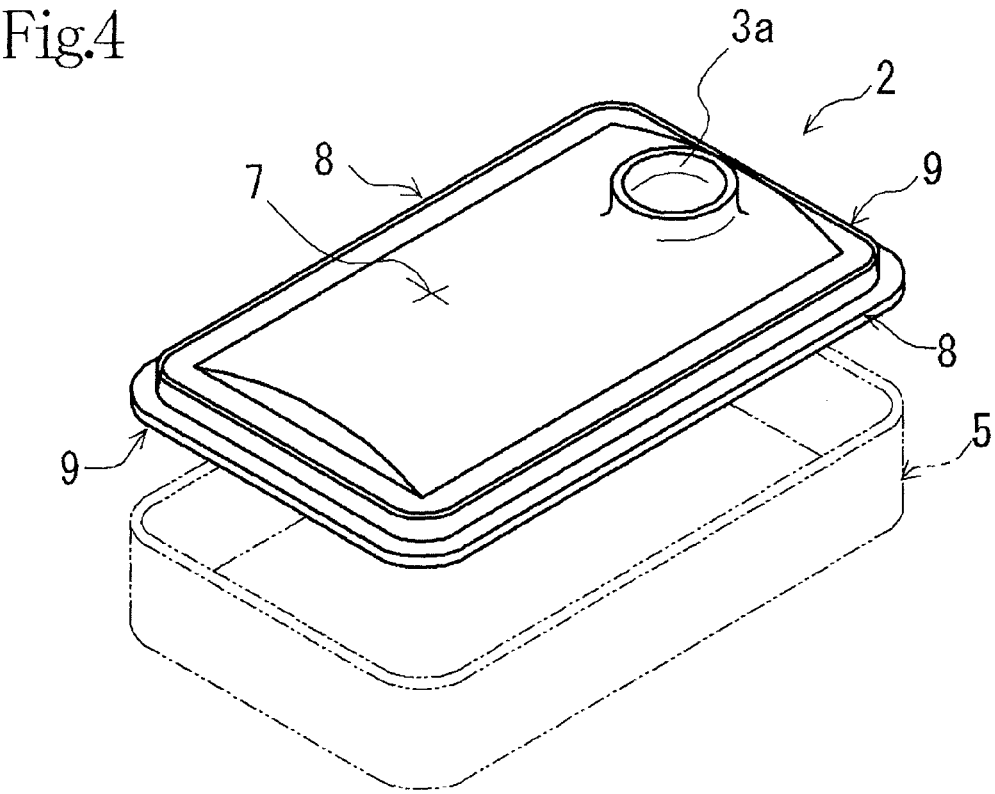
FIG. 4 is a perspective view of an upper case according to one example embodiment.

The automatic transmission fluid filter according to the present embodiments may include a form, for example, in which the one case is formed substantially rectangular in plan view, while the connecting wall is formed to have a circular arc surface with an axis center in the longitudinal direction of the one case (for example, see FIG. 4, etc.). Thereby the case can have improved rigidity, and prevent deterioration of the flow properties of the fluid flowing in the longitudinal direction inside the case.

Figure 2:
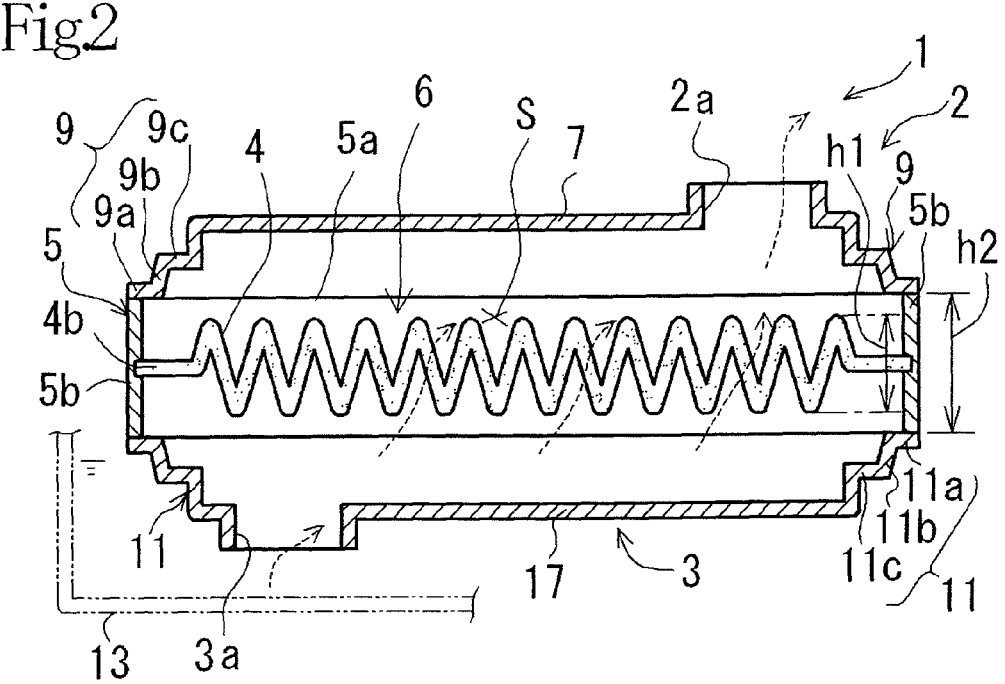
FIG. 2 is a sectional view along the line II-II of FIG. 1.

The automatic transmission fluid filter according to the present embodiments may include a form, for example, in which the filter medium is formed in a pleated shape, and the holder frame includes a pair of first walls (5*a*) holding pleated edges (4*a*) of the filter medium and joined with the joint portions of the one case, and a pair of second walls (5*b*) continuous with these first walls and holding non-pleated edges (4*b*) of the filter medium, these first walls and second walls having a larger height (h2) than the pleats height (h1) of the filter medium (for example, see FIG. 2, etc.). Thereby the filter medium can have a large filtering area and improved filtering efficiency.

EXAMPLE

The present invention will be hereinafter described more specifically by way of examples of embodiment using the drawings. The "automatic transmission fluid filter" according to the invention is herein exemplified as an oil filter.

(1) Structure of the Oil Filter

The oil filter 1 according to this example embodiment includes an upper case 2 made of a laser transmitting resin and having an outlet port 2*a*, a lower case 3 made of a laser transmitting resin and having an inlet port 3*a*, and a filter element 6 including a filter medium 4 and a holder frame 5 made of a laser absorbing resin, holding the periphery of the filter medium 4 and held between the upper case 2 and the lower case 3, as shown in FIG. 1 to FIG. 4. These upper case 2 and lower case 3 are respectively formed to be substantially rectangular in plan view.

The filter element 6 is integrally formed with the filter medium 4 and holder frame 5 by insertion molding. This filter medium 4 is formed substantially rectangular in plan view and in a pleated shape. The holder frame 5 includes a pair of first walls 5a holding pleated edges 4a of the filter medium 4, and a pair of second walls 5b continuous with these first walls 5a and holding non-pleated edges 4b of the filter medium 4. These first walls 5a and second walls 5b have a larger height h2 than the pleats height h1 of the filter medium 4. These holder frame 5, upper case 2 and lower case 3 form a filter chamber S of the oil filter 1, as well as an outer surface (design surface).

Figure 3:
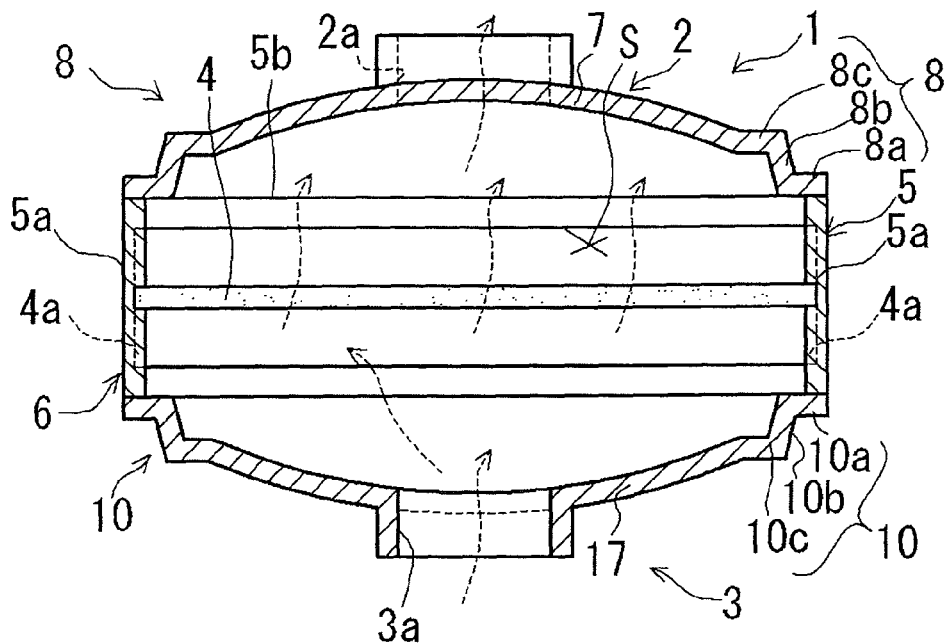
FIG. 3 is an enlarged sectional view along the line of FIG. 1.

The upper case 2 includes a pair of joint portions 8 respectively joined to the pair of first walls 5a, a pair of joint portions 9 respectively joined to the pair of second walls 5b, and a connecting wall 7 connecting these joint portions 8 and 9 and having a circular arc longitudinal cross section protruding outward (upward) of the upper case 2, as shown in FIG. 2 and FIG. 3. These joint portions 8 and 9 are continuous and in a stepped flange shape as a whole (see FIG. 4). The connecting wall 7 is formed to have a circular arc surface having an axis center along a longitudinal direction of the upper case 2, with a radius of curvature R (see FIG. 5) of about 150 mm.

The joint portions 8 respectively include a first lateral wall 8a having an outer end joined to an upper end face of the first wall 5a of the holder frame 5 by laser welding and extending substantially horizontally inward (toward the center) of the upper case 2, a vertical wall 8b standing from an inner end of this first lateral wall 8a, and a second lateral wall 8c extending substantially horizontally inward (toward the center) of the upper case 2 from a standing distal end of the vertical wall 8b, as shown in FIG. 3. To an inner end of this second lateral wall 8c is connected an outer end of the connecting wall 7.

The joint portions 9 respectively include a first lateral wall 9a having an outer end joined to an upper end face of the second wall 5b of the holder frame 5 by laser welding and extending substantially horizontally inward (toward the center) of the upper case 2, a vertical wall 9b standing from an inner end of this first lateral wall 9a, and a second lateral wall 9c extending substantially horizontally inward (toward the center) of the upper case 2 from a standing distal end of the vertical wall 9b, as shown in FIG. 2. To an inner end of this second lateral wall 9c is connected an outer end of the connecting wall 7.

The lower case 3 includes a pair of joint portions 10 respectively joined to the pair of first walls 5a, a pair of joint portions 11 respectively joined to the pair of second walls 5b, and a connecting wall 17 connecting these pairs of joint portions 10 and 11 and having a circular arc longitudinal cross section protruding outward (downward) of the lower case 3, as shown in FIG. 2 and FIG. 3. These joint portions 10 and 11 are continuous and in a stepped flange shape as a whole. The connecting wall 17 is formed to have a circular arc surface having an axis center along a longitudinal direction of the lower case 3, with a radius of curvature of about 150 mm.

The joint portions 10 respectively include a first lateral wall 10a having an outer end joined to a lower end face of the first wall 5a of the holder frame 5 by laser welding and extending substantially horizontally inward (toward the center) of the lower case 3, a vertical wall 10b standing from an inner end of this first lateral wall 10a, and a second lateral wall 10c extending substantially horizontally inward (toward the center) of the lower case 3 from a standing distal end of the vertical wall 10b, as shown in FIG. 3. To an inner end of this second lateral wall 10c is connected an outer end of the connecting wall 17.

The joint portions 11 respectively include a first lateral wall 11a having an outer end joined to a lower end face of the second wall 5b of the holder frame 5 by laser welding and extending substantially horizontally inward (toward the center) of the lower case 3, a vertical wall 11b standing from an inner end of this first lateral wall 11a, and a second lateral wall 11c extending substantially horizontally inward (toward the center) of the lower case 3 from a standing distal end of the vertical wall 11b, as shown in FIG. 2. To an inner end of this second lateral wall 11c is connected an outer end of the connecting wall 17.

(2) Method of Fabricating the Oil Filter

Next, a method of fabricating the oil filter 1 having the above structure will be described. As shown in FIG. 5, the joint portion 8 (9) of the upper case 2 is abutted on the upper end face of the wall 5a (5b) of the holder frame 5, and in this abutted state, the first lateral wall 8a (9a) and second lateral wall 8c (9c) of the upper case 2 are pressed down with jigs 15a and 15b. In this pressed state, a laser beam L is irradiated from above through a gap between the jigs 15a and 15b over the entire circumference of the upper case 2. The laser beam L transmits the first lateral wall 8a (9a) of the upper case 2 and reaches a projection 18 formed on the upper end face of the holder frame 5. This projection 18 is melted, and so is the first lateral wall 8a (9a) of the upper case 2. Thus the first lateral wall 8a (9a) of the upper case 2 is joined to the holder frame 5 by laser welding. The lower case 3 is joined to the holder frame 5 by laser welding in a similar manner as with the above-described upper case 2.

The oil filter 1 is immersed in oil inside an oil pan 13 (see FIG. 2) when used. The oil used on the automatic transmission side is accumulated inside the oil pan 13, and this accumulated oil is made to flow into the filter chamber S from the inlet port 3a and filtered by the filter medium 4, as indicated by broken lines with arrows in FIG. 2 and FIG. 3. Filtered oil flows out from the outlet port 2a and returns to the automatic transmission side.

(3) Effects of the Example Embodiment

According to the oil filter 1 of this example embodiment, the cases 2 and 3 include pairs of joint portions 8 and 10 respectively joined to the opposite walls 5a of the holder frame 5, and connecting walls 7 and 17 connecting the pairs of joint portions 8 and 10 and having a circular arc longitudinal cross section protruding outward of the cases 2 and 3, so that the cases 2 and 3 need not be provided with internal ribs and yet can have enhanced rigidity due to the connecting walls 7 and 17 having a circular arc longitudinal cross section. The cases 2 and 3 have a substantially uniform wall thickness so that resin flowability during the case molding process is improved, as well as the amount of use of resin can be reduced, i.e., the fabrication properties of the cases 2 and 3 are improved. Also, the fluid inside the cases 2 and 3 will have better flow properties during the use of the filter so that the pressure loss can be reduced. Further, the cases 2 and 3 have a good appearance.

In this example embodiment, the pairs of joint portions 8 and 10 are formed to respectively include first lateral walls 8a and 10a, vertical walls 8b and 10b, and second lateral walls 8c and 10c, the outer ends of the connecting walls 7 and 17 being connected to the inner ends of the second lateral walls 8c and 10c. This way, the stress locally applied on the cases 2 and 3 by the vertical walls 8b and 10b can be dispersed and the points of stress can be distanced from the first lateral walls 8a and 10a, whereby the rigidity (in particular, joint strength) of the cases 2 and 3 can be further improved. Since the first lateral walls 8a and 10a can be joined to the walls 5a of the holder frame 5 by laser welding, with the first lateral walls 8a and 10a and second lateral walls 8c and 10c being pressed down with jigs 15a and 15b, the case fabrication properties can be improved. In addition, when the first lateral walls 8a and 10a and second lateral walls 8c and 10c are pressed down with the jigs 15a and 15b, the first lateral walls 8a and 10a can conform to the walls 5a of the holder frame 5 due to flexure of the vertical walls 8b and 10b, which contributes to a further improvement in the case fabrication properties.

In this example embodiment, the cases 2 and 3 are made of a laser transmitting resin, while the holder frame 5 is made of a laser absorbing resin, and the joint portions 8 and 10 are joined to the walls 5a of the holder frame 5 by laser welding. Therefore the cases 2 and 3 can be easily joined to the holder frame 5 and can have a good appearance even though a transparent or translucent material is employed for the cases 2 and 3.

In this example embodiment, the cases 2 and 3 are formed substantially rectangular in plan view, while the connecting walls 7 and 17 are formed in a circular arc surface having an axis center in the longitudinal direction of the cases 2 and 3, so that the cases 2 and 3 can have enhanced rigidity, and prevent deterioration of the flow properties of fluid flowing in the longitudinal direction inside the cases 2 and 3.

In this example embodiment, the filter medium 4 is formed in a pleated shape, while the holder frame 5 is formed to include a pair of first walls 5a, which hold pleated edges 4a of the filter medium 4 and to which first lateral walls 8a and 10a of the cases 2 and 3 are joined, and a pair of second walls 5b continuous with these first walls 5a and holding non-pleated edges 4b of the filter medium 4. These first walls 5a and second walls 5b have a larger height h2 than the pleats height h1 of the filter medium 4. Therefore, the filter medium 4 can have a larger filter area and improved filtering efficiency.

The present invention is not limited to the above example embodiment and can be variously modified in accordance with the purposes and applications within the scope of the invention. Namely, while one form was described in the above example embodiment wherein the joint portions 8 and 10 of the cases 2 and 3 respectively include first lateral walls 8a and 10a, vertical walls 8b and 10b, and second lateral walls 8c and 10c, the invention is not limited to this. For example, as shown in FIG. 6, as another design for the joint portion 8' of the case 2 (or case 3), it may include a first lateral wall 8a' having an outer end joined to an upper end face of the first wall 5a of the holder frame 5 by laser welding and extending substantially horizontally inward (toward the center) of the upper case 2, and a vertical wall 8b' standing from an inner end of this first lateral wall 8a', the outer ends of the connecting wall 7 being connected to standing distal ends of the vertical walls 8b'. Alternatively, for example as shown in FIG. 7, the joint portion 8" of the case 2 (or case 3) may include a first lateral wall 8a" having an outer end joined to an upper end face of the first wall 5a of the holder frame 5 by laser welding and extending substantially horizontally inward (toward the center) of the upper case 2, the outer ends of the connecting wall 7 being connected to inner ends of the first lateral walls 8a".

Figure 8:
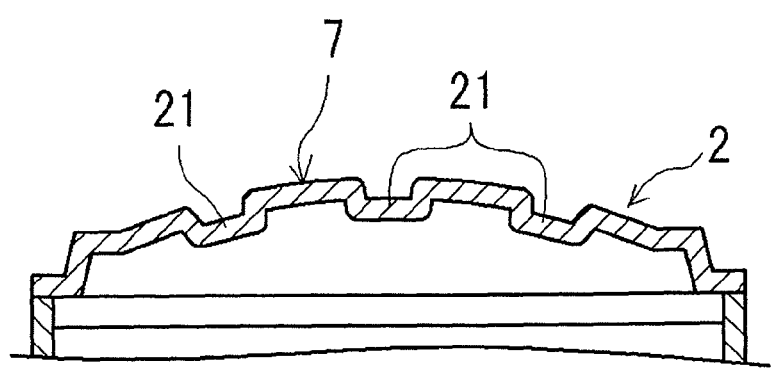
FIG. 8 is a sectional view of essential parts for describing an upper case according to a further example embodiment.
Figure 9:
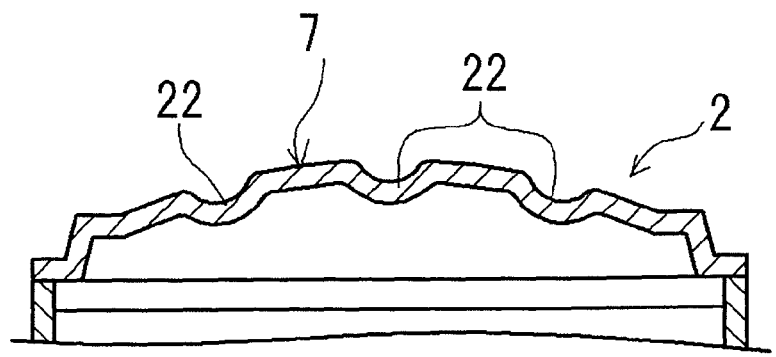
FIG. 9 is a sectional view of essential parts for describing an upper case according to another example embodiment.
Figure 10:
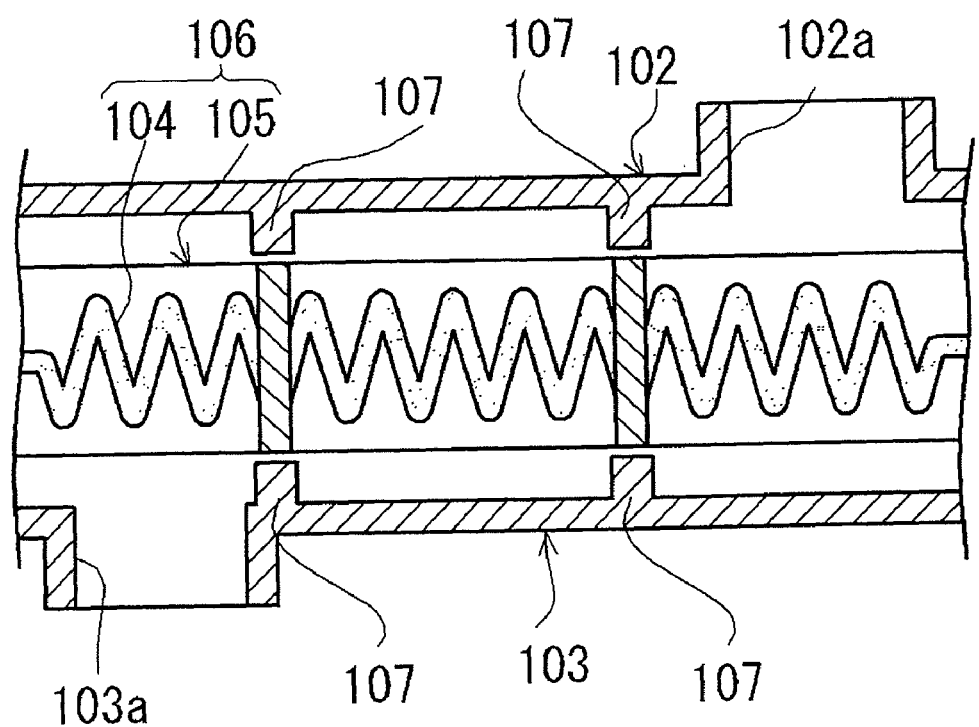
FIG. 10 is a sectional view of essential parts of a conventional oil filter.

In the above examples of embodiment, for example as shown in FIG. 8, the connecting wall 7 of the case 2 (or case 3) may be formed with generally U-shaped corrugations 21, or for example as shown in FIG. 9, the connecting wall 7 of the case 2 (or case 3) may be formed with undulating ribs 22, or the connecting wall 7 of the case 2 (or case 3) may be formed with generally V-shaped corrugations. In the case with providing V-shaped corrugations, these corrugations should preferably be provided in a shape corresponding to the pleats of the filter medium 4, so that the oil flow area between the filter medium 4 and the cases 2 and 3 will be substantially uniform.

While one form of the cases 2 and 3 was described in the above example embodiment wherein both cases have circular arc shaped connecting walls 7 and 17, the invention is not limited to this. For example, one of the cases 2 and 3 may have a circular arc shaped connecting wall while the other case may have a flat connecting wall.

While the connecting walls 7 and 17 having one circular arc portion were shown in the above example embodiment, the invention is not limited to this. The connecting walls 7, 17 may have a plurality of circular arc portions with different radii of curvature, for example, or may have a circular arc portion and a linear portion.

While the connecting walls 7 and 17 having a circular arc surface with an axis center in the longitudinal direction of the cases 2 and 3 were shown in the above example embodiment, the invention is not limited to this. The connecting walls may have a circular arc surface with an axis center in the direction of shorter sides of the cases 2 and 3. Alternatively, the connecting walls may be in a dome shape protruding toward the center of the cases 2 and 3.

While a tubular inlet port 3a was illustrated in the above example embodiment, the invention is not limited to this, and the inlet port may be formed, for example, as a hole provided in the lower case 3, for example. The inlet port 3a, however, should preferably be tubular from a viewpoint of reducing air entrapment in the oil pan 13.

While a pleated filter medium 4 was illustrated in the above example embodiment, the invention is not limited to this and the filter medium may be in the form of a sheet, corrugated, or bag-shaped. The material for the filter medium may be, for example, non-woven cloth, woven fabric, paper, and the like.

In the above example embodiment, laser welding was illustrated as one form of joining the cases 2 and 3 and the holder frame 5. The invention is not limited to this and these parts may be joined together by any of vibration welding, ultrasonic welding, hot plate welding, or bonding with an adhesive or the like.

The invention is widely applicable as a technique for filtering fluid used in automatic transmissions such as a torque control type, CVT, and the like. More particularly, the invention can favorably be used as an automatic transmission fluid filter for automobiles, buses, trucks, as well as other vehicles including railroad vehicles such as locomotives and cars, construction vehicles, agricultural vehicles, industrial vehicles, and the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. An automatic transmission fluid filter, comprising:
a plastic upper case having an outlet port;
a plastic lower case having an inlet port; and
a filter element including a filter medium and a plastic holder frame holding a peripheral part of the filter medium and held between the upper case and the lower case, wherein
at least one of the upper case and the lower case includes:
a pair of joint portions respectively joined to opposite walls of the holder frame, each joint portion including a first lateral wall having a lower outer end joined to an upper end of one of the walls of the holder frame and extending laterally inward of one case, and a connecting wall connecting the pair of joint portions and having a circular arc longitudinal cross section protruding outward of the one case.

2. The automatic transmission fluid filter according to claim 1, wherein each joint portion further includes a vertical wall standing from an inner end of the first lateral wall, and a second lateral wall extending laterally inward of the one case from a standing distal end of the vertical wall, and outer ends of the connecting wall are connected to inner ends of the second lateral walls.

3. The automatic transmission fluid filter according to claim 1, wherein each joint portion further includes a vertical wall standing from an inner end of the first lateral wall, and outer ends of the connecting wall are connected to standing distal ends of the vertical walls.

4. The automatic transmission fluid filter according to claim 1, wherein the one case is made of a laser transmitting resin while the holder frame is made of a laser absorbing resin, and the joint portions are joined to the walls of the holder frame by laser welding.

5. The automatic transmission fluid filter according to claim 2, wherein the one case is made of a laser transmitting resin while the holder frame is made of a laser absorbing resin, and the joint portions are joined to the walls of the holder frame by laser welding.

6. The automatic transmission fluid filter according to claim 3, wherein the one case is made of a laser transmitting resin while the holder frame is made of a laser absorbing resin, and the joint portions are joined to the walls of the holder frame by laser welding.

7. The automatic transmission fluid filter according to claim 1, wherein the connecting wall has a radius of curvature of 50 mm to 300 mm.

8. The automatic transmission fluid filter according to claim 1, wherein the filter medium is pleated shaped, and the holder frame includes a pair of first walls holding pleated edges of the filter medium and joined with the joint portions of the one case, and a pair of second walls continuous with the first walls and holding non-pleated edges of the filter medium, the first walls and second walls having a height greater than a height of pleats of the filter medium.

* * * * *